United States Patent [19]

Bloomer et al.

[11] Patent Number: 4,467,245

[45] Date of Patent: Aug. 21, 1984

[54] CURRENT-LIMITED SPARK GAP FOR TRANSIENT PROTECTION

[75] Inventors: Milton D. Bloomer; Francois D. Martzloff, both of Schenectady, N.Y.

[73] Assignee: General Electric Company, Schenectady, N.Y.

[21] Appl. No.: 468,000

[22] Filed: Feb. 18, 1983

[51] Int. Cl.³ .............................................. H01K 1/68
[52] U.S. Cl. ..................................... 315/75; 315/127; 315/207; 315/240; 361/56; 361/111
[58] Field of Search ..................................... 315/73–75, 315/125–127, 207, 240, 241 R; 307/126, 130; 361/56, 111, 126

[56] References Cited

U.S. PATENT DOCUMENTS 2,888,639  5/1959  Petermichl et al. .............. 361/56 X
3,660,719  5/1972  Grenier .................................. 361/56

Primary Examiner—Eugene R. LaRoche
Attorney, Agent, or Firm—Geoffrey H. Krauss; James C. Davis, Jr.; Marvin Snyder

[57] ABSTRACT

High voltage transients are effectively clamped by means of a spark gap, in parallel connection with a load to be protected, and having a capacitor in series with the parallelled load-spark gap combination. The series capacitor limits follow-through current through the spark gap to a level permitting survival of the spark gap. Where the load is an incandescent lamp, the spark gap is formed by shaping the lamp internal lead structure, such that an additional external spark gap component is not required.

13 Claims, 2 Drawing Figures

CURRENT-LIMITED SPARK GAP FOR TRANSIENT PROTECTION

BACKGROUND OF THE INVENTION

The present invention relates to transient voltage protection means and, more particularly, to a novel current-limited spark gap circuit for providing voltage transient protection to a load.

Many electrical and electronic components are subject to damaging or destructive effects due to high voltage transients. It is well known that a spark gap is an effective way of clamping a voltage transient, although a spark gap may itself be destroyed by the effects of a follow-through current. This follow-through current is generally limited only by the line impedance in series with the spark gap, whereby very large currents can flow in the spark gap arc path initially ionized by the transient. Thus, where a load is connected to the A.C. power line, and a spark gap transient protector is placed in parallel with the load to be protected, the power line inductance, between the A.C. power source and the parallelled spark gap and load, is the only significant factor limiting the follow-through current through the ionized spark gap when a transient occurs.

It is well known that transient voltage spikes on the A.C. power line, such as caused by switching of inductive and other loads or by nearby lightning strikes, can disturb or destroy electronic circuitry powered from the A.C. power line. It is perhaps less well known that voltage spikes in the 1–3 kV. range can easily destroy an ordinary incandescent lamp, even if the transient pulse lasts only a few microseconds. In some cases, destruction of the incandescent lamp appears to result from concentration of the transient energy in the cathode-fall of the resulting arc to the lamp filament. There is also evidence that the line-frequency (e.g. 60 Hz. in the United States) follow-through current, in the path initially ionized by the transient arc, is the cause of some failures. This same line-frequency follow-through current has also been shown to destroy spark gaps placed, for transient protection, in parallel with incandescent lamps. Unless the spark gap structure is physically large enough to dissipate the nearly short circuit energy delivered by the A.C. power line, between the time the transient ionizes the gap and the next zero-crossing of the power line current waveform, the spark gap will be destroyed. Typically, a gap structure capable of dissipating the energy introduced into the spark gap by the follow-through current is impossibly large for utilization with the component originally to be protected by the spark gap. It is therefore highly desirable to provide a transient protector using a spark gap through which the follow-through current is limited to a value permitting the spark gap to survive.

BRIEF SUMMARY OF THE INVENTION

In accordance with the invention, a load to be protected is parallelled by a spark gap having ignition characteristics predetermined to cause gap ionization responsive to a preselected transient voltage magnitude; a current-limiting capacitive element is placed in series with the parallelled spark gap and protected component, to limit follow-through current through the spark gap to a level at which the spark gap can survive.

In one presently preferred embodiment, wherein the load component is an incandescent lamp operating from a voltage less than power line voltage and having a control circuit in parallel therewith for switching the value of a capacitance in series with the lamp, the spark gap is provided by forming the lamp leads, internal to the base thereof, to have a predetermined gap distance therebetween.

Accordingly, it is an object of the present invention to provide a spark gap-type transient protector in which the follow-through current in the spark gap is limited to a value at which the spark gap can survive.

This and other objects of the present invention will become apparent upon consideration of the following detailed description, when read in conjunction with the drawings.

DETAILED DESCRIPTION OF THE INVENTION

Figure 1:
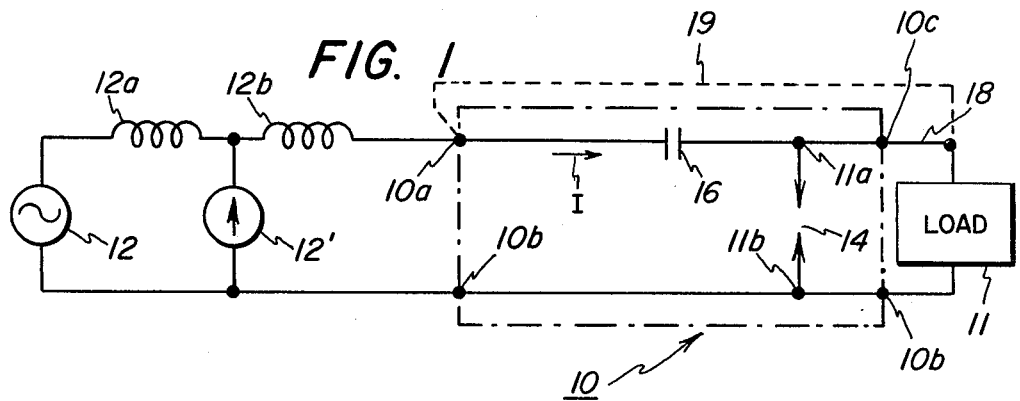
FIG. 1 is a schematic block diagram illustrating a current-limited spark gap transient protector, in accordance with the principles of the present invention, and of the environment in which the transient protector is utilized.

Referring initially to FIG. 1, our transient protector 10 is utilized to protect a load 11 from voltage transients introduced between a pair of terminals 10a and 10b connected through a power line, having some degree of power line inductances 12a and 12b between the load and an A.C. power source 12. As is well known to the art, a transient source 12' can provide a high voltage transient which appear across terminals 10a and 10b, due to switching of inductor or other loads or due to nearby lightning strikes and the like. Thus, transient source 12' can provide these voltage spikes at any point along the power line. While it is well known to use a spark gap 14 across load 11 (i.e. between load terminals 10c and 10b) for transient protection of the load, when the transient spike of source 12' causes spark gap 14 to ionize, the instantaneous current I flowing from source 12 through spark gap 14 is limited mainly by the magnitude of line inductances 12a and 12b. Since these line inductances are relatively small, a very large instantaneous follow-through current I can flow through spark gap 14, and may well destroy the spark gap.

In accordance with the invention, a follow-through-current-limiting reactive element 16, such a capacitor and the like, is placed in series with the spark gap 14-load 11 parallel combination. The impedance of element 16 may be selected for a desired impedance at the power line frequency.

The load can be connected either across the spark gap, as by connection 18 to load terminal 10c or can be connected, if desired, across the spark gap/impedance element series combination, as shown by the broken line connection 19 to terminal 10a, instead of connection 18. The reactance spark gap combination thus has little effect, if any, on normal operation of the load, but provides a large degree of protection to the load if a transient occurs. If the load is connected, as shown, across the spark gap, the magnitude of reactance 16 may be selected to provide an acceptable, predetermined voltage drop between the power line terminals 10a and 10b and the load terminals.

It will be appreciated that the physical size of spark gap 14, and hence the energy-dissipative quality thereof, must be coordinated with the reactance of component 16. For a load 11 capable of operating with a larger reactance of component 16, the follow-through current I will be proportionally reduced and the amount of energy to be dissipated by spark gap 14 will be likewise reduced, whereby the physical size of spark gap 14 can itself be accordingly reduced.

Figure 2:
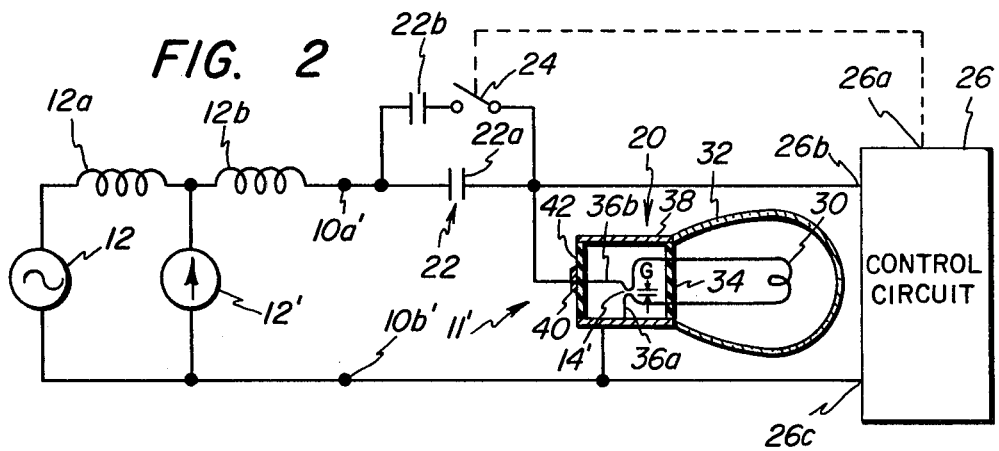
FIG. 2 is a schematic diagram of a presently preferred embodiment of the transient protector, utilized with a low-voltage incandescent lamp, a switched-capacitor load current controller and a control circuit therefor.

Referring now to FIG. 2, in a presently preferred embodiment, the load 11' comprises an incandescent lamp 20, designed to operate at a voltage less than the line voltage, in conjunction with switched capacitive means 22 in series therewith. Capacitive means 22 includes a first capacitive element 22a in permanent series connection with lamp 20, and a second capacitive element 22b placed in parallel connection with first capacitive element 22a by action of a switching means 24, operated responsive to an output 26a of a control circuit 26. The control circuit receives power and informational input from a pair of leads 26b and 26c connected in parallel with the load lamp 20. Load 11' is more fully described and claimed in co-pending application Ser. No. 382,875, filed May 28, 1982, assigned to the assignee of the present invention and incorporated herein in its entirety by reference.

Incandescent lamp 20 utilizes a filament 30 positioned within a light-transmissive bulb 32, of glass and the like materials. An insulative member 34 not only supports filament 30, but also closes off bulb 32, whereby the volume defined by bulb 32 and member 34 may be placed under pressure, if required, for the particular lamp. One end of filament 30 is formed into a first conductive lead wire 36a to the conductive shell 38 of the lamp base, while the other end of filament 30 is formed into a second conductive lead wire 36b to a conductive contact 40, typically located at the center of the bulb base, upon a second insulative member 42. In accordance with one aspect of the present invention, lead wires 36a and 36b are, in the chamber formed by annular element 38 and insulative members 34 and 42, so formed as to have portions thereof spaced at a gap distance G, to form a spark gap 14' having a predetermined ignition potential, within incandescent lamp 20. It will be seen that spark gap 14' is in parallel with not only the filament 30, but with the control circuit means 26, both of which are to be protected, and that the spark gap and parallel protected components are in series with at least reactive component 22a. For use with a particular low voltage lamp 20, the permanently-connected ballasting reactance 22a is a capacitor which limits 60 Hz. current to less than 2 amperes. The selectably-switched capacitance 22b allows an additonal current, on the order of one-half ampere, to flow between line terminals 10a and 10b. Thus, the spark gap follow-through current I' is limited to being no greater than about 2.5 amperes and spark gap 14' can be constructed of lead wires having a relatively modest cross-sectional area. It will be understood that spark gap 14' is advantageously placed within that portion of lamp 20 which is either evacuated or is at a relatively low pressure.

While presently preferred embodiments of our novel current-limited spark gap transient protector are described by way of example herein, many modifications and variations will now become apparent to those skilled in the art. It is our intent, therefore, to be limited only by the scope of the appending claims and not by the specific details and instrumentalities presented by way of description of the preferred embodiments herein.

What is claimed is:

1. A method for providing protection to a load from transients appearing between first and second line conductors providing operating power to the load, comprising the steps of:
   providing a spark gap having a predetermined ionization potential;
   providing a reactive component in series with the spark gap, said reactive component having a reactance selected to limit any follow-through current through the ionized spark gap to a magnitude survivable by the spark gap; and
   connecting only the reactive element and spark gap in series combination between said line conductors.

2. The method of claim 1, wherein said reactive element is a capacitive element.

3. The method of claim 2, further comprising the step of connecting the load in parallel with the series-connected capacitive element and spark gap and between the line conductors.

4. The method of claim 2, wherein the load is connected in parallel with the spark gap.

5. Apparatus for protecting a load component from a transient appearing between first and second line conductors providing operating power to said load, comprising:
   a spark gap having a predetermined ionization potential; and
   a reactive element in series connection only with said spark gap between said first and second line conductors; the reactance of said reactive element being selected to limit any follow-through current through the ionized spark gap to a predetermined magnitude selected to allow said spark gap to survive.

6. The apparatus of claim 5, wherein said reactive element is a capacitive element.

7. The apparatus of claim 6, wherein said load is connected in parallel with said spark gap.

8. The apparatus of claim 7, wherein said load is an incandescent lamp.

9. The apparatus of claim 8, wherein said lamp includes first and second terminal means, a filament, and first and second conductive lead means for facilitating a flow of current from a first one of said terminal means through said filament to the remaining one of said terminal means; said spark gap being formed by positioning at least a portion of each of said first and second lead means at a predetermined gap distance G therebetween.

10. The apparatus of claim 9, wherein said bulb includes a volume at less than ambient atmospheric pressure; said spark gap being positioned within said volume.

11. The apparatus of claim 9, wherein said bulb operates at a potential less than the A.C. potential between said first and second line conductors; and further comprising a second capacitive element; means for switching said second capacitive element into and out of parallel connection across said capacitive element, responsive to a control signal; and control circuit means connected across said spark gap for providing said control signal to said switching means.

12. The apparatus of claim 11, wherein said capacitive element has a reactance at said A.C. frequency limiting the current flowing through said filament to a current on the order of 2 amperes.

13. The apparatus of claim 12, wherein said second capacitive element has an impedance limiting the current flow therethrough at said A.C. frequency to a current on the order of about one-half ampere.

* * * * *